(12) United States Patent
Christie

(10) Patent No.: US 9,499,301 B1
(45) Date of Patent: Nov. 22, 2016

(54) ROLLING MODULAR PALLET SYSTEM

(71) Applicant: Eugene P Christie, Parrish, FL (US)

(72) Inventor: Eugene P Christie, Parrish, FL (US)

( * ) Notice: Subject to any disclaimer, the term of this patent is extended or adjusted under 35 U.S.C. 154(b) by 0 days.

(21) Appl. No.: 14/707,791

(22) Filed: May 8, 2015

(51) Int. Cl.
 *B62B 3/02* (2006.01)
 *B65D 19/42* (2006.01)
 *B62B 3/00* (2006.01)
 *B62B 5/06* (2006.01)

(52) U.S. Cl.
 CPC ............... *B65D 19/42* (2013.01); *B62B 3/007* (2013.01); *B62B 5/06* (2013.01); *B62B 3/02* (2013.01)

(58) Field of Classification Search
 CPC ....................................................... B62B 3/02
 See application file for complete search history.

(56) References Cited

U.S. PATENT DOCUMENTS

| | | | | |
|---|---|---|---|---|
| 3,099,020 A * | 7/1963 | Garfield | ................. | A61G 7/001 5/620 |
| 4,595,107 A * | 6/1986 | Welsch | ................. | A47B 57/265 108/147.13 |
| 4,754,885 A * | 7/1988 | Rich | ........................ | A47F 5/132 211/132.1 |
| 5,090,725 A * | 2/1992 | Feldner | ..................... | B62B 3/02 211/189 |
| 5,257,794 A * | 11/1993 | Nakamura | ................. | B62B 3/00 211/182 |
| 6,669,213 B2 * | 12/2003 | Woerner | ................. | B62B 3/002 280/47.35 |
| 7,513,511 B2 * | 4/2009 | Chaseateau | ............. | B62B 1/002 280/43.1 |
| 8,083,194 B2 * | 12/2011 | Sandusky | ............... | B62B 3/005 248/220.21 |
| 8,132,277 B2 * | 3/2012 | Buchanan | .............. | A61G 1/013 108/157.13 |
| 8,746,377 B1 * | 6/2014 | Dunbar | ................. | B62B 5/0003 180/19.2 |
| D760,463 S * | 6/2016 | Kellogg | ......................... | D32/36 |
| 2004/0004334 A1 * | 1/2004 | Chen | ......................... | B62B 3/02 280/47.34 |
| 2006/0017247 A1 * | 1/2006 | Farley | ................. | A47B 47/0083 280/79.3 |
| 2007/0056106 A1 * | 3/2007 | Roberts | ................. | A61G 1/0293 5/620 |
| 2012/0007343 A1 * | 1/2012 | Webster | ................. | B62B 3/008 280/659 |
| 2014/0083005 A1 * | 3/2014 | Collins | ..................... | A01G 9/02 47/66.6 |

* cited by examiner

*Primary Examiner* — Erez Gurari
(74) *Attorney, Agent, or Firm* — David J. Bromer

(57) ABSTRACT

A modular pallet system includes a lower shelf having vertically linkable corner fittings connected to side bars and cross bars arranged in a substantially horizontal plane. The pallet system further includes a plurality of uprights connected to the vertically linkable corner fittings and extending upwards from the lower shelf. At least two of the uprights may be connected together by a horizontal handle spaced apart from the lower shelf. Additionally, the pallet system includes castors connected to vertically linkable corner fittings of the lower shelf and extending downward from the lower shelf.

14 Claims, 3 Drawing Sheets

ROLLING MODULAR PALLET SYSTEM

The invention is a modular pallet system of rollable pallet sections that can be connected together to form rolling structures of various sizes. The system can be utilized to move products from a warehouse, to a trailer, and then directly to a retail store display floor without unpacking, stacking, or shelving. In addition, components of the pallet system itself may be used as point-of-purchase display platform.

RELATED APPLICATIONS

This patent application includes descriptions and embodiments that may find relation to U.S. Provisional Patent Application No. 61/563,845 to Christie, titled Multi-Configuration Structural Fitting, also to U.S. Provisional Patent Application No. 61/955,840, also to U.S. Pat. No. 5,483,899 to Christie, titled Modular Pallet Arrangement, and to U.S. Pat. No. 5,094,175 to Christie, titled Modular Pallet Arrangement, all of which are incorporated herein by reference.

BACKGROUND OF THE INVENTION

Shipping costs, labor for material handling, and just-in-time manufacturing have awakened a need for simplified and flexible means to transport retail and commercial products from manufacturers and distributors to sales outlets and retail stores in the most economical ways available. Innovative cradle-to-grave transportation can provide the critical percentages that mark the difference between success and failure.

Big-box stores have access to custom-manufactured products such as "rolltainers" and various other wire-constructed, multi-use, material-handling units that are designed to the retailers specific requirements (i.e., dimensional limits that accommodate pre-existing pallet sizes, turning radii, door passage sizes, etc.) so that units can be packed with product, packed into semi-trailers, unloaded to a shipping dock and wheeled onto the retail floor.

Smaller retail outlets seeking similar units must either design and manufacture their own custom units (and assume the R&D, prototyping, and production costs), adapt to the pre-set requirements of a big-box store (and purchase their units, if available)—possibly requiring modifications to aisle sizes, passageways and shipping containers—or forego the potential advantages of the multi-use material-handling units.

There is clearly a need for a modular rolling pallet system that can be constructed to a user's specifications from easily available materials and utilized to transport and display a wide variety of product types.

SUMMARY OF THE INVENTION

In one embodiment, the invention includes a modular pallet system including a lower shelf constructed of a plurality of vertically linkable lower corner fittings connected by lower side bars and lower cross bars configured in a substantially horizontal plane. The modular pallet system further includes a plurality of uprights connected to and extending upward from first corner fittings of the plurality of lower corner fittings. At least two of the plurality of uprights are linked together by a horizontal handle, with the handle being spaced apart from the lower shelf by the at least two uprights. Also, the modular pallet system includes a plurality of castors connected to second corner fittings of the plurality of lower corner fittings and extending downward from the second corner fittings.

In another embodiment, the invention includes a method of constructing a modular pallet system including assembling a lower shell by connecting a plurality of vertically linkable lower corner fittings to lower side bars and lower cross bars configured in a substantially horizontally plane. The method further includes connecting a plurality of uprights to first corner fittings of the plurality of lower corner fittings with the plurality of uprights extending upward from the first corner fittings. At least two of the plurality of uprights are linked together by a horizontal handle and the handle is spaced apart from the lower shelf by the at least two uprights. The method further includes connecting a plurality of castors to second corner fittings of the plurality of lower corner fittings so that the plurality of castors extend downward from the second corner fittings.

In a further embodiment, the invention includes a rolling modular pallet including a lower shelf with a plurality of vertically linkable lower corner fittings connected by lower side bars and lower cross bars configured in a substantially horizontal plane. The rolling modular pallet further includes a plurality of uprights connected to and extending upward from first corner fittings of the plurality of lower corner fittings, with at least two of the plurality of uprights being linked together by a horizontal handle that is spaced apart from the lower shelf by the at least two uprights. The rolling modular pallet further includes an upper shelf with a plurality of upper corner fittings connected by upper side bars and upper cross bars configured in a substantially horizontal plane. At least some of the upper corner fittings are connected to the plurality of uprights opposite the first corner fittings, and the upper shelf is spaced above the lower shelf by the plurality of uprights. The rolling modular pallet further includes a plurality of castors connected to second corner fittings of the plurality of lower corner fittings and extending downward from the second corner fittings.

Additional aspects of the invention will be apparent to those of ordinary skill in the art in view of the detailed description of various embodiments, which is made with reference to the drawings, a brief description of which is provided below.

DETAILED DESCRIPTION OF THE INVENTION

Figure 1:
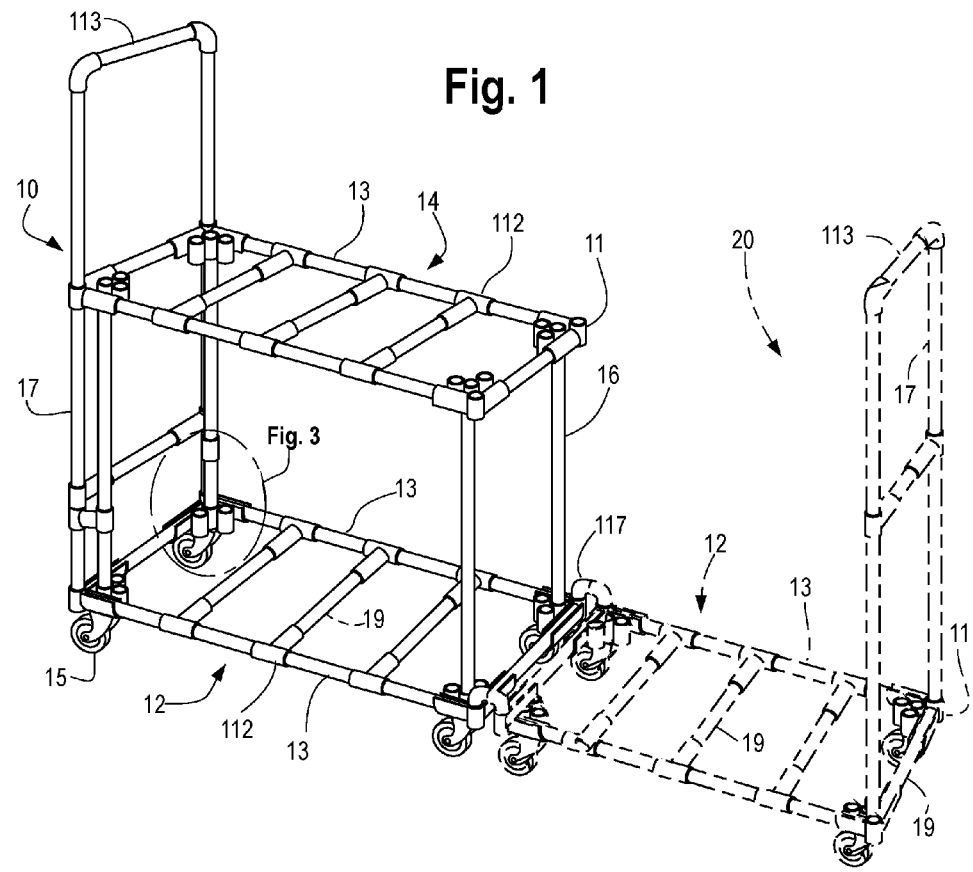
FIG. 1 is a view of an embodiment of a pallet system including a two-shelf pallet and a one-shelf pallet.

An exemplary embodiment of the modular rolling pallet system is illustrated in FIG. 1 which shows an assembly of two separate pallets 10 and 20 (shown in dashed lines). Pallet 10 is a two-shelf pallet embodiment and pallet 20 is a one-shelf pallet embodiment. It will be evident to those having ordinary skill in the art that the invention may be configured in various ways and constructed of various materials while still fulfilling the necessary functions disclosed in this specification.

As seen in FIG. 1, the pallet 10 includes a lower shelf 12 including side bars 13 and cross bars 19 connected together to form in the aggregate a substantially planar support surface. Here and in other descriptions of pallet shelves, the term "substantially planar support surface" refers to a configuration of cross bars and side bars whose outer surfaces intersect a common virtual plane. The outermost side bars 13 and cross bars 19 are connected to unique vertically linkable corner fittings 11, and establish an outer perimeter of the substantially planar product surface provided by the lower shelf 12.

Also evident in FIG. 1 are several uprights 16, 17 that are connected to the pallets 10 and 20 at various convenient locations. The uprights provide flexible utility by capturing the various products that are placed or piled on the pallet system. The uprights further provide a stable framework that prevents stacks of product from tipping or sliding off the pallet system while the system is in motion. In general, the functions of outer uprights and inner uprights may be interchangeable.

Figure 2:
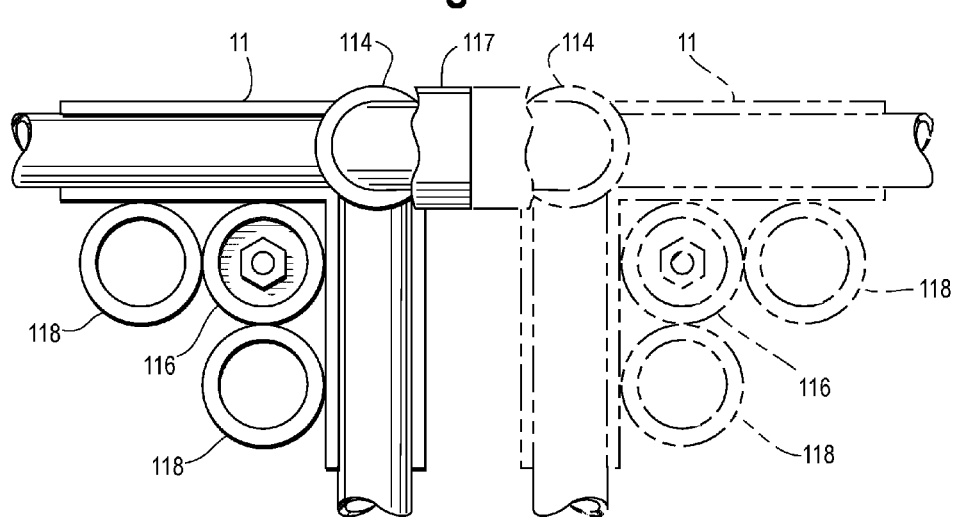
FIG. 2 is a section top view of a portion of the embodiment of the pallet system of FIG. 1.

Specifically shown in FIG. 1 are outer uprights 16, so named because they are seated the outer collar 114 of the unique corner fitting 11 (further illustrated in FIG. 2). Here and throughout, the term "vertically linkable corner fittings" may be used interchangeably with "unique corner fitting" for simplicity. In the two-shelf pallet 10, the outer uprights 16 provide necessary spacing between the upper and lower shelves, and also act to establish the outer perimeter of the planar support surface, and provide anchors to the rearward components of the upper shelf 14 and the lower shelf 12 via the unique corner fittings 11. In both pallet 10 and 20, the outer uprights 16 are connected to a respective horizontal handle 113 which may be utilized to propel and steer the pallet.

Also shown in FIG. 1 are the inner uprights 17 which are seated in the inner collars 116 of the unique corner fittings. At the rear of the two-shelf pallet, the inner uprights 17 add stiffness and strength to the outer uprights 16 which may be helpful in resisting bending caused by forces on the handle 113. The inner uprights 17 at the front of the two-shelf pallet provide similar functionality as the outer uprights 17 at the rear, demonstrating the flexibility of the unique corner connectors 11. With identical vertically linkable corner fittings 11 at each corner of each shelf, any of the corner fitting collars can be connected between upper and lower shelves. Of course, if the load requires extra strength, the forward uprights may be doubled or even tripled by seating additional uprights in supplemental collars of each unique corner fitting.

In FIG. 1, the outer collars 114 of the forward unique corner fittings of both pallet 10 and pallet 20 are utilized to couple the two-shelf pallet 10 and the one shelf pallet 20 together to form a double-length rolling pallet system. Couplers 117 can be fabricated from various available components and may also be custom-designed. For heavy loads (or long trains of pallets) multiple couplers 117 seated in various collars can be used to connect pallets together.

The pallet system provides some additional advantages. For one, the length and width of the pallet may be varied simply by modifying the lengths of the side and cross bars used in the construction of the pallet, so that the pallet can be designed for a specific product or package. Additionally, the structure allows for placement of uprights and handle assemblies simply by inserting strategically placed T-fittings 112 (or similar structures) on the side and/or cross bars that form the lower shelf 12 and the upper shelf 14.

FIG. 2 illustrates the flexibility and multiple features of a vertically linkable corner fitting 11. Looking down on the forward unique corner fittings 11 of the connected pallets 10 and 20, the outer collars 114 have a coupler 117 seated therein. Also, in these embodiments, the inner collars 116 contain the stems of castors 15, on which the pallets 10 and 20 rest and utilize for rolling capability. Supplemental collars 118 are clearly shown to be oppositely adjacent to the inner collars 116. The vertically linkable corner fitting 11 utilized in the current embodiments is a modified version of the Multi-Configuration Structural Fitting disclosed in U.S. Provisional Patent Application 61/563,845. The supplemental inner collars 118 incorporated in the vertically linkable corner fitting are not present in the Multi-Configuration Structural Fitting.

Figure 3:
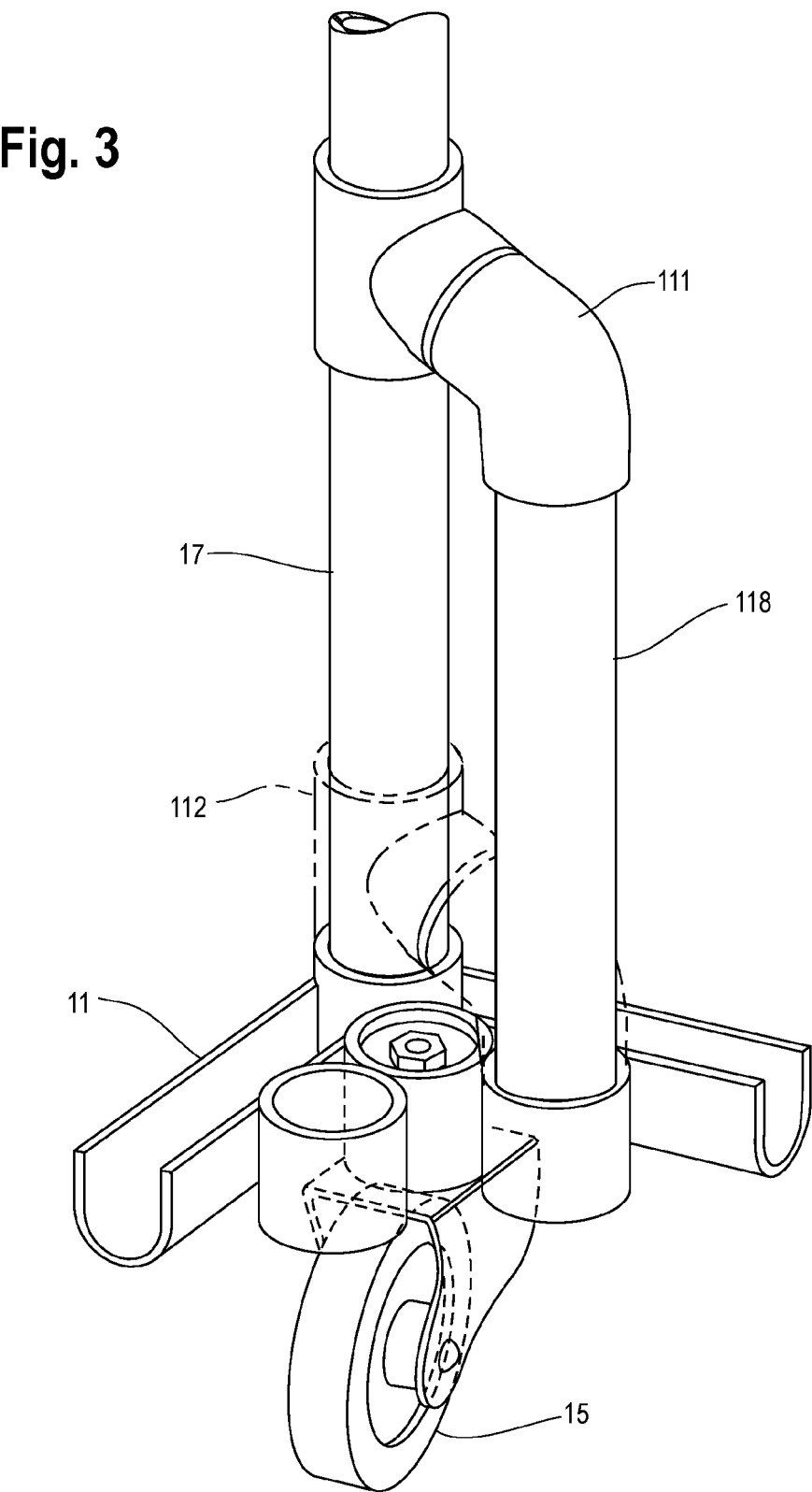
FIG. 3 is a partial section view of a portion of an embodiment of a pallet system.

FIG. 3 shows components of a reinforced upright configuration. The configuration shown in FIG. 3 may be utilized in a simple one-shelf embodiment and may also be applied in one form or another in multi-shelf embodiments such as the two-shelf pallet 10. The unique corner fitting 11 includes a downward-extending castor 15 seated in an inner collar 116, an inner upright 16 seated in a supplemental collar 118, an outer upright 17 seated in an outer collar 114, and assorted conventional fittings such as a tee fitting 112 and a 90-elbow 111. The combination of paired inner and outer uprights provides increased strength for supporting heavy products as well as increased stiffness to resist bending and flexing. For additional strength, an auxiliary upright (not shown) may be seated in the other supplemental collar 118 and connected to either the inner upright, the outer upright, or both, using additional fittings as appropriate.

Figure 4:
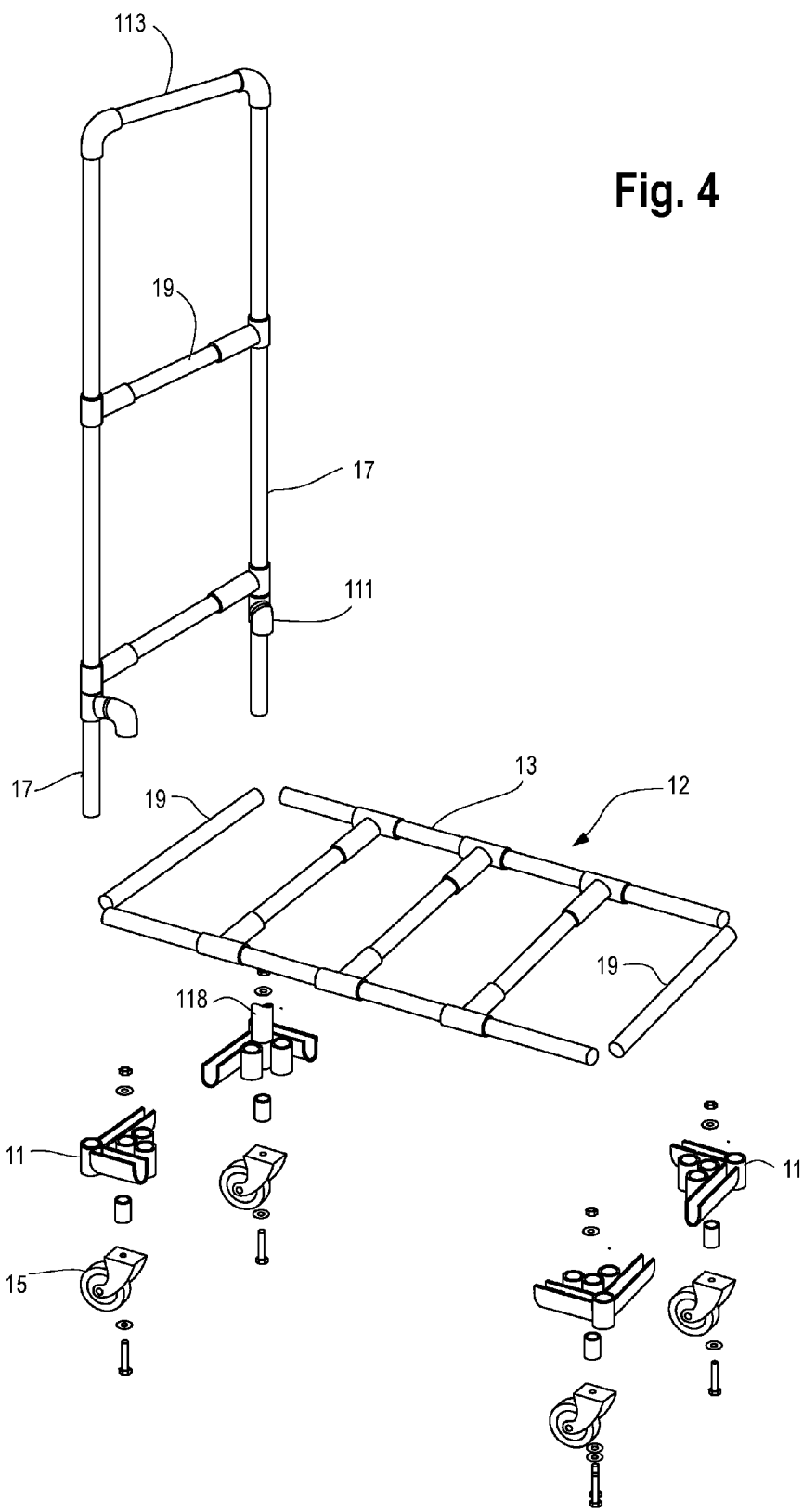
FIG. 4 is an exploded view of an embodiment of a pallet system.

Turning now to FIG. 4, an exploded view of an embodiment of a one-shelf pallet 20A is illustrated. The one-shelf pallet 20A utilizes similar components as the embodiments 10 and 20. One-shelf pallet 20A comprises a lower shelf 12 that including side bars 13 and cross bars 19 connected together to form a substantially planar support surface. The outermost side bars 13 and cross bars 19 are connected to unique vertically linkable corner fittings 11, and establish an outer perimeter of the substantially planar product surface provided by the lower shelf 12. Additional cross bars 19 provide additional support surfaces between the side bars 13. The additional cross bars 19 may connect to the side bars 13 utilizing conventional tee fittings 112.

In the embodiment 20A, outer uprights 17 extend upwards from rearward unique corner fittings 11 of the lower shelf 12 and are connected by a horizontal handle 113. Also, the outer uprights 17 are stiffened and strengthened along part of their length by inner uprights 16. The inner uprights 16 and outer uprights 17 are connected together by conventional 90-elbows 111.

The one-shelf pallet 20A includes castors 15 seated in inner collars 116 of the unique corner fittings 11 and directed downward to provide rolling support for the one-shelf pallet 20A.

The example embodiments of the invention described here illustrate a variety of configurations that can be utilized to move products from a warehouse, to a trailer, and then directly to a retail store display floor without unpacking, stacking, or shelving. Although specific embodiments have been illustrated and described herein, it will be appreciated by those of ordinary skill in the art that any arrangement that achieves the same purpose, structure, or function may be substituted for the specific embodiments shown. This application is intended to cover any adaptations or variations of the example embodiments of the invention described herein.

It is intended that this invention be limited only by the claims, and the full scope of equivalents thereof.

The invention claimed is:

1. A modular pallet system comprising:
    a lower shelf including a plurality of vertically linkable lower corner fittings connected by lower side bars and lower cross bars configured in a substantially horizontal plane, each vertically linkable lower corner fitting comprising:
        an outer upright vertical collar,
        an inner upright vertical collar, and
        a first supplemental vertical collar and a second supplemental vertical collar, the first and second supplemental vertical collars being oppositely adjacent to the inner upright vertical collar;
    a plurality of uprights, each upright seated in an upright vertical collar of a respective lower corner fitting, at least two of the plurality of uprights being linked together by a horizontal handle, the handle being spaced apart from the lower shelf by the at least two uprights; and
    a plurality of castors connected to second corner fittings of the plurality of lower corner fittings and extending downward from the second corner fittings.

2. The modular pallet system of claim 1, wherein the second corner fittings comprise the plurality of lower corner fittings.

3. The modular pallet system of claim 1, further comprising:
    another lower shelf including another plurality of vertically linkable lower corner fittings connected by lower side bars and lower cross bars configured in a substantially horizontal plane;
    another plurality of uprights connected to and extending upward from first corner fittings of the another plurality of lower corner fittings, at least two of the plurality of uprights being linked together by another horizontal handle, the another handle being spaced apart from the another lower shelf by the at least two uprights; and
    another plurality of castors connected to second corner fittings of the another plurality of lower corner fittings and extending downward from the second corner fittings;
    wherein two lower corner fittings of the lower shelf are connected to two lower corner fittings of the another lower shelf via a U-shaped coupler seated in a respective outer upright vertical collar of each of the two lower corner fittings.

4. The modular pallet system of claim 1, wherein the plurality of uprights include an outer upright seated in an outer upright vertical collar of a corner fitting and an inner upright seated in an inner upright vertical collar of the corner fitting.

5. The modular pallet system of claim 1, further comprising:
    an upper shelf including a plurality of upper fittings vertically aligned with at least some of the plurality of lower corner fittings and connected by upper side bars and upper cross bars configured in a substantially horizontal plane, at least some of the upper corner fittings being connected to the plurality of uprights opposite the first corner fittings, the upper shelf being spaced above the lower shelf by the plurality of uprights.

6. The modular pallet system of claim 5, wherein each of the plurality of upper corner fittings comprises:
    an outer upright vertical collar;
    an inner upright vertical collar; and
    a first supplemental vertical collar and a second supplemental vertical collar, the first and second supplemental vertical collars being oppositely adjacent to the inner upright vertical collar;
    wherein each of the plurality of uprights are seated in an outer upright vertical collar of a lower corner fitting and in an outer upright vertical collar of an upper corner fitting.

7. A method of constructing a modular pallet system comprising:
    assembling a lower shell by connecting a plurality of vertically linkable lower corner fittings to lower side bars and lower cross bars configured in a substantially horizontally plane, each corner fitting of the plurality of lower corner fittings including:
        an outer upright vertical collar;
        an inner upright vertical collar; and
        a first supplemental vertical collar and a second supplemental vertical collar, the first and second supplemental vertical collars being oppositely adjacent to the inner upright vertical collar;
    connecting a plurality of uprights to first corner fittings of the plurality of lower corner fittings, the plurality of uprights being seated in an upright vertical collar of a respective lower corner fitting, at least two of the plurality of uprights being linked together by a horizontal handle, the handle being spaced apart from the lower shelf by the at least two uprights; and
    connecting a plurality of castors to second corner fittings of the plurality of lower corner fittings, the plurality of castors extending downward from the second corner fittings.

8. The method of claim 7, wherein the second corner fittings comprise the plurality of lower corner fittings.

9. The method of claim 7, further comprising:
    assembling another lower shelf by connecting another plurality of vertically linkable lower corner fittings connected by lower side bars and lower cross bars configured in a substantially horizontal plane;
    connecting another plurality of uprights to first corner fittings of the another plurality of lower corner fittings, the another plurality of uprights extending upward from the first corner fittings, at least two of the another plurality of uprights being linked together by another horizontal handle, the another handle being spaced apart from the another lower shelf by the at least two uprights; and
    connecting another plurality of castors to second corner fittings of the another plurality of lower corner fittings, the another plurality of castors extending downward from the second corner fittings;
    wherein two lower corner fittings of the lower shelf are connected to two lower corner fittings of the another lower shelf via a U-shaped coupler seated in a respective outer upright vertical collar of each of the two lower corner fittings.

10. The method of claim 7, wherein the plurality of uprights include an outer upright seated in an outer upright vertical collar of a corner fitting and an inner upright seated in an inner upright vertical collar of the corner fitting.

11. The method of claim 7, further comprising:
    assembling an upper shelf by connecting a plurality of upper corner fittings vertically aligned with at least some of the plurality of lower corner fittings connected by upper side bars and upper cross bars configured in a substantially horizontal plane, at least some of the upper corner fittings being connected to the plurality of uprights opposite the first corner fittings, the upper shelf being spaced above the lower shelf by the plurality of uprights.

12. A rolling modular pallet comprising:
a lower shelf including a plurality of vertically linkable lower corner fittings connected by lower side bars and lower cross bars configured in a substantially horizontal plane, each corner fitting of the plurality of lower corner fittings including:
   an outer upright vertical collar;
   an inner upright vertical collar; and
   a first supplemental vertical collar and a second supplemental vertical collar, the first and second supplemental vertical collars being oppositely adjacent to the inner upright vertical collar;
a plurality of uprights, at least two of the plurality being seated in an upright vertical collar of a respective lower corner fitting connected to and extending upward from first corner fittings of the plurality of lower corner fittings, the at least two of the plurality of uprights being linked together by a horizontal handle, the handle being spaced apart from the lower shelf by the at least two uprights;
an upper shelf including a plurality of upper corner fittings connected by upper side bars and upper cross bars configured in a substantially horizontal plane, at least some of the upper corner fittings being connected to the plurality of uprights opposite the first corner fittings, the upper shelf being spaced above the lower shelf by the plurality of uprights; and
a plurality of castors connected to second corner fittings of the plurality of lower corner fittings and extending downward from the second corner fittings.

13. The rolling modular pallet of claim 12, wherein each corner fitting of the plurality of vertically linkable upper corner fitting comprises:
   an outer upright vertical collar;
   an inner upright vertical collar; and
   a first supplemental vertical collar and a second supplemental vertical collar, the first and second supplemental vertical collars being oppositely adjacent to the inner upright vertical collar;
   wherein each of the plurality of uprights are seated in an outer upright vertical collar of a lower corner fitting and in an outer upright vertical collar of an upper corner fitting.

14. The rolling modular pallet of claim 13, further comprising at least two inner uprights and two outer uprights seated in an inner upright vertical collar and an outer upright vertical collar of respective lower and upper corner fittings.

* * * * *